US010638130B1

(12) United States Patent
Alakuijala et al.

(10) Patent No.: US 10,638,130 B1
(45) Date of Patent: Apr. 28, 2020

(54) ENTROPY-INSPIRED DIRECTIONAL FILTERING FOR IMAGE CODING

(71) Applicant: GOOGLE LLC, Mountain View, CA (US)

(72) Inventors: Jyrki Alakuijala, Wollerau (CH); Lode Vandevenne, Rüschlikon (CH); Thomas Fischbacher, Gattikon (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/378,843

(22) Filed: Apr. 9, 2019

(51) Int. Cl.
*H04N 19/137* (2014.01)
*H04N 19/182* (2014.01)
*H04N 19/117* (2014.01)
*H04N 19/176* (2014.01)
*H04N 19/86* (2014.01)

(52) U.S. Cl.
CPC ......... *H04N 19/117* (2014.11); *H04N 19/137* (2014.11); *H04N 19/176* (2014.11); *H04N 19/182* (2014.11); *H04N 19/86* (2014.11)

(58) Field of Classification Search
CPC ............................ H04N 19/117; H04N 19/137
See application file for complete search history.

(56) References Cited

U.S. PATENT DOCUMENTS 5,337,086 A * 8/1994 Fujinami .............. H04N 19/517
375/240.16
5,367,385 A 11/1994 Yuan
7,072,525 B1 7/2006 Covell
7,961,357 B2 6/2011 Kim et al.
8,787,443 B2 7/2014 Sun et al.
(Continued)

FOREIGN PATENT DOCUMENTS

EP          2339852 A1    6/2011
EP          2477403 A1    7/2012
WO      2011128023 A1   10/2011

OTHER PUBLICATIONS

Jeong et al; "A Directional Deblocking Filter Based on Intra Prediction for H.264/AVC"; IEICE Electronics Express, vol. 6, No. 12, pp. 864-869; Jun. 25, 2009.
(Continued)

*Primary Examiner* — Irfan Habib
(74) *Attorney, Agent, or Firm* — Young Basile Hanlon & MacFarlane, P.C.

(57) ABSTRACT

An image block is coded using entropy-inspired directional filtering. During encoding, intensity differences are determined for at least some pixels of an image block based on neighboring pixels of respective ones of the at least some pixels. Angles are estimated for each of those pixels based on the intensity differences. A main filtering direction of the image block is then determined based on the estimated angles. The image block is filtered according to the main filtering direction to remove artifacts along oblique edges associated with the image block. The filtered image block is then encoded to an encoded image. During decoding, an angular map indicating angles estimated for pixels of an encoded image block is received and used to determine the main filtering direction of the image block. The image block can then be filtered according to the main filtering direction and then output for display or storage.

20 Claims, 7 Drawing Sheets

(56) References Cited

U.S. PATENT DOCUMENTS

| | | | | |
|---|---|---|---|---|
| 9,148,666 | B2* | 9/2015 | Park | H04N 19/463 |
| 9,204,163 | B2* | 12/2015 | Kim | H04N 19/56 |
| 2004/0008784 | A1* | 1/2004 | Kikuchi | H04N 19/573 |
| | | | | 375/240.16 |
| 2005/0053134 | A1* | 3/2005 | Holcomb | H04N 19/70 |
| | | | | 375/240.12 |
| 2007/0071107 | A1* | 3/2007 | Ha | H04N 19/597 |
| | | | | 375/240.24 |
| 2008/0089416 | A1* | 4/2008 | Jeon | H04N 19/117 |
| | | | | 375/240.15 |
| 2009/0238269 | A1* | 9/2009 | Pandit | H04N 19/597 |
| | | | | 375/240.12 |
| 2010/0021072 | A1* | 1/2010 | Shimizu | H04N 19/527 |
| | | | | 382/233 |
| 2010/0086222 | A1* | 4/2010 | Shimizu | H04N 19/597 |
| | | | | 382/232 |
| 2010/0111416 | A1 | 5/2010 | Meiers | |
| 2010/0158129 | A1* | 6/2010 | Lai | H04N 19/597 |
| | | | | 375/240.16 |
| 2010/0284469 | A1* | 11/2010 | Sato | H04N 19/176 |
| | | | | 375/240.16 |
| 2011/0069752 | A1 | 3/2011 | Watanabe et al. | |
| 2011/0169820 | A1* | 7/2011 | Saito | G03B 35/08 |
| | | | | 345/419 |
| 2011/0200100 | A1 | 8/2011 | Kim et al. | |
| 2011/0200103 | A1 | 8/2011 | Kim et al. | |
| 2012/0014614 | A1* | 1/2012 | Takahashi | H04N 19/60 |
| | | | | 382/238 |
| 2012/0082219 | A1 | 4/2012 | Sun et al. | |
| 2012/0134415 | A1* | 5/2012 | Lin | H04N 19/61 |
| | | | | 375/240.16 |
| 2012/0134416 | A1* | 5/2012 | Lin | H04N 19/52 |
| | | | | 375/240.16 |
| 2012/0224637 | A1* | 9/2012 | Sugio | H04N 19/52 |
| | | | | 375/240.16 |
| 2013/0088570 | A1* | 4/2013 | Takahashi | H04N 19/597 |
| | | | | 348/43 |
| 2013/0107964 | A1* | 5/2013 | Wahadaniah | H04N 19/513 |
| | | | | 375/240.16 |
| 2013/0129240 | A1 | 5/2013 | Shima | |
| 2013/0342647 | A1* | 12/2013 | Takahashi | G06T 15/205 |
| | | | | 348/43 |
| 2014/0002592 | A1* | 1/2014 | Takahashi | H04N 19/597 |
| | | | | 348/42 |
| 2014/0085418 | A1* | 3/2014 | Takahashi | H04N 19/597 |
| | | | | 348/43 |
| 2014/0104383 | A1* | 4/2014 | Yoshitomo | H04N 19/597 |
| | | | | 348/43 |
| 2014/0126641 | A1* | 5/2014 | Takahashi | H04N 19/597 |
| | | | | 375/240.16 |
| 2014/0126642 | A1* | 5/2014 | Takahashi | H04N 19/117 |
| | | | | 375/240.16 |
| 2014/0198847 | A1* | 7/2014 | Takahashi | H04N 19/597 |
| | | | | 375/240.12 |
| 2014/0321546 | A1* | 10/2014 | Sakurai | H04N 19/597 |
| | | | | 375/240.16 |
| 2014/0341285 | A1* | 11/2014 | Sakurai | H04N 19/597 |
| | | | | 375/240.12 |
| 2015/0023425 | A1 | 1/2015 | Sun et al. | |
| 2015/0163491 | A1 | 6/2015 | Alshin et al. | |
| 2015/0326876 | A1* | 11/2015 | Tsai | H04N 19/52 |
| | | | | 375/240.16 |
| 2016/0205410 | A1* | 7/2016 | Lin | H04N 19/52 |
| | | | | 375/240.16 |
| 2017/0302965 | A1 | 10/2017 | Xu et al. | |
| 2019/0052912 | A1 | 2/2019 | Chen et al. | |
| 2019/0373282 | A1* | 12/2019 | Takahashi | H04N 19/61 |

OTHER PUBLICATIONS

Jeong et al., "A directional deblocking filter based on intra prediction for H.264/AVC", IEICE Electronics Express, vol. 6, No. 12, Jun. 25, 2009, pp. 864-869.

Maani, "CE8 Subset 2: Parametric Adaptive Loop Filter", JCT-VC of ITU-T SG16 WP3 and ISO/IEC JTC1/SC29/WG11, 6th Meeting, Torino, Italy, Jul. 14-22, 2011, 6 pgs.

Lin et al., "Improved Advanced Motion Vector Prediction", JCT-VC of ITU-T SG16 WP3 and ISO/IEC JTC1/SC29/WG11, 4th Meeting: Daegu, Korea, Jan. 20-28, 2011, 8 pgs.

Kim et al., "An Efficient Motion Vector Coding Scheme Based on Minimum Bitrate Prediction", IEEE Transactions on Image Processing, vol. 8, No. 8, Aug. 1, 1999, pp. 1117-1120.

Valin Jm. The Daala directional deringing filter. arXiv preprint arXiv:1602.05975. Feb. 18, 2016.

Bankoski, et al., "Technical Overview of VP8, An Open Source Video Codec for the Web", Jul. 11, 2011, 6 pp.

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

International Search Report and Written Opinion of International Application No. PCT/US2019/062962 dated Feb. 25, 2020.

* cited by examiner

ENTROPY-INSPIRED DIRECTIONAL FILTERING FOR IMAGE CODING

BACKGROUND

Image content represents a significant amount of online content. A web page may include multiple images, and a large portion of the time and resources spent rendering the web page are dedicated to rendering those images for display. The amount of time and resources required to receive and render an image for display depends in part on the manner in which the image is encoded. As such, an image, and therefore a web page that includes the image, can be rendered faster by reducing the total data size of the image using encoding and decoding techniques.

SUMMARY

Disclosed herein are, inter alia, systems and techniques for image coding using entropy-inspired directional filtering.

A method for encoding an image block according to an implementation of this disclosure includes initializing values at indices of an array of angle candidates to zero. A number of the indices of the array is equal to a number of angle candidates available for encoding the image block. Each of the indices corresponds to one of the angle candidates. For each current pixel of a plurality of pixels of the image block: an intensity difference is determined based on a difference in intensity values of neighboring pixels of the current block; an angle is estimated for the current pixel by calculating a function of the intensity difference of the current pixel; and a value at an index within the array of the angle candidate that corresponds to the estimated angle is increased. A main filtering direction of the image block is determined based on the angle candidate having the largest value in the array. The image block is filtered according to the main filtering direction to remove one or more artifacts along an oblique edge associated with the image block. The filtered image block is encoded to an encoded image.

An apparatus for encoding an image block according to an implementation of this disclosure includes a memory and a processor. The memory stores instructions and an array of angle candidates having a number of indices based on a number of angle candidates available for encoding the image block. The processor is configured to execute instructions stored in the memory to initialize values at the indices of the array of angle candidates to zero. For each current pixel of a plurality of pixels of the image block, the processor further executes the instructions to: determine an intensity difference based on a difference in intensity values of neighboring pixels of the current pixel; estimate an angle for the current pixel by calculating a function of the intensity difference of the current pixel; and increase a value at an index within the array of the angle candidate that corresponds to the estimated angle. The processor further executes the instructions to determine a main filtering direction of the image block based on the angle candidate having the largest value in the array. The processor further executes the instructions to filter the image block according to the main filtering direction to remove one or more artifacts along an oblique edge associated with the image block. The processor further executes the instructions to encode the filtered image block to an encoded image.

A method for encoding an image block according to an implementation of this disclosure includes determining respective intensity differences for at least some pixels of the image block based on neighboring pixels of respective ones of the at least some pixels. Respective angles are estimated for each of the at least some pixels based on the respective intensity differences. A main filtering direction of the image block is determined based on the estimated angles. The image block is filtered according to the main filtering direction to remove one or more artifacts along an oblique edge associated with the image block. The filtered image block is encoded to an encoded image.

A method for decoding an encoded image block according to an implementation of this disclosure includes receiving an angular map indicating angle candidates for pixels of the encoded image block. The encoded image block is decoded to produce a decoded image block. Values at indices of an array of angle candidates are initialized to zero. A number of the indices of the array is equal to a number of angle candidates available for filtering the decoded image block. Each of the indices corresponds to one of the angle candidates. For each current pixel of a plurality of pixels of the decoded image block, a value at an index within the array of the angle candidate that corresponds to that current pixel as indicated in the angular map is increased. A main filtering direction of the decoded image block is determined based on the angle candidate having the largest value in the array. The decoded image block is filtered according to the main filtering direction to remove one or more artifacts along an oblique edge associated with the decoded image block. The filtered image block is output for display or storage.

An apparatus for decoding an encoded image block according to an implementation of this disclosure includes a memory and a processor. The memory stores instructions and an array of angle candidates having a number of indices based on a number of angle candidates available for filtering the encoded image block. The processor is configured to execute instructions stored in the memory to receive an angular map indicating angle candidates for pixels of the encoded image block. The processor further executes the instructions to decode the encoded image block to produce a decoded image block. The processor further executes the instructions to initialize values at the indices of the array of angle candidates to zero. For each current pixel of a plurality of pixels of the decoded image block, the processor further executes the instructions to increase a value at an index within the array of the angle candidate that corresponds to that current pixel as indicated in the angular map. The processor further executes the instructions to determine a main filtering direction of the image block based on the angle candidate having the largest value in the array. The processor further executes the instructions to filter the decoded image block according to the main filtering direction to remove one or more artifacts along an oblique edge associated with the decoded image block. The processor further executes the instructions to output the filtered image block for display or storage.

A method for decoding an encoded image block according to an implementation of this disclosure includes decoding the encoded image block to produce a decoded image block and receiving an angular map indicating angle candidates for pixels of the encoded image block. A main filtering direction of the decoded image block is determined based on the angular map. The decoded image block is filtered according to the main filtering direction to remove one or more artifacts along an oblique edge associated with the decoded image block. The filtered image block is output for display or storage.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIG. 1 is a block diagram of an example of an image coding system.

DETAILED DESCRIPTION

Figure 1:
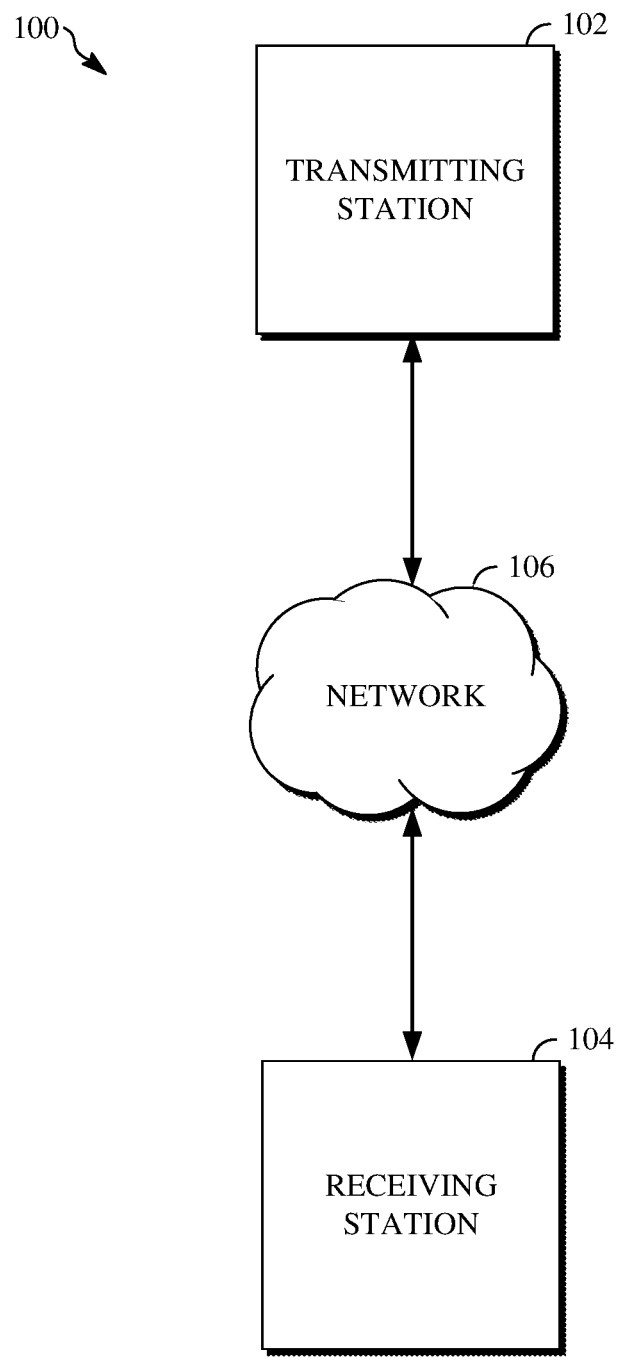

Lossy image encoding involves reducing the amount of data within an image to be encoded, such as using quantization. In exchange for a decreased bit cost of the resulting encoded image, the image suffers certain quality loss. The extent of the quality loss depends largely upon the manner by which the image data was quantized during the encoding. In particular, the quantization of image data can result in discontinuities, or artifacts, throughout the image. These artifacts may be present along block boundaries, such as due to differences in the encoding of individual neighboring blocks within the image. However, in some cases, artifacts may be present on oblique lines, such as on non-perpendicular edges of an object shown within the image itself.

These artifacts may be reduced by applying a filter to the coefficients of an image block. For example, the filter may be applied to quantized transform coefficients before those coefficients are entropy encoded to an encoded image during encoding. In another example, the filter may be applied to coefficients after those coefficients have been entropy decoded, dequantized, and inverse transformed during decoding. The filtering may remove artifacts from an image, such as to reproduce that image in its pre-encoded form. However, conventional filtering approaches are typically designed for removing artifacts from block boundaries. As such, conventional filtering approaches may not be effective in removing certain artifacts, such as artifacts located about an oblique edge of an object within the image.

One solution to filtering artifacts for oblique edges in an image uses a directional filter of a given tap size to filter along the edge in question. Based on the tap size used, a number of pixels on each side of the edge are compared and used to calculate a filtered value, which may, for example, be a simple average of the respective pixel values. However, that approach fails to consider other pixel values within the block and instead limits its processing to some number of pixels which immediately neighbor an edge. In many cases, this may limit the efficacy of the filtering itself, such as by ignoring other pixel information within the block.

Implementations of this disclosure address problems such as these using entropy-inspired directional filtering for image coding. During encoding, intensity differences are determined for at least some pixels of an image block based on neighboring pixels of respective ones of the at least some pixels. Angles are estimated for each of those pixels based on the intensity differences. For example, an array of angle candidates can be used. For each of those pixels, a determination can be made that the intensity difference corresponds to one of the angle candidates, and a value at an index of the angle candidate within the array can be increased.

A main filtering direction of the image block is then determined based on the estimated angles. The image block is filtered according to the main filtering direction to remove one or more artifacts along an oblique edge associated with the image block. The filtered image block is then encoded to an encoded image. During decoding, an angular map indicating angles estimated for pixels of an encoded image block, for example, during encoding, can be received and used to determine the main filtering direction of the image block. The image block can then be filtered according to the main filtering direction and then output for display or storage.

Further details of techniques for image coding using entropy-inspired directional filtering are described herein with initial reference to a system in which such techniques can be implemented. FIG. 1 is a diagram of an example of an image coding system 100. The image coding system 100 includes a transmitting station 102, a receiving station 104, and a network 106. The image coding system 100 can be used, for example, to encode and decode an image.

The transmitting station 102 is a computing device that encodes and transmits an image. Alternatively, the transmitting station 102 may include two or more distributed devices for encoding and transmitting an image. The receiving station 104 is a computing device that receives and decodes an encoded image. Alternatively, the receiving station 104 may include two or more distributed devices for receiving and decoding an encoded image. An example of a computing device used to implement one or both of the transmitting station 102 or the receiving station 104 is described below with respect to FIG. 2.

The network 106 connects the transmitting station 102 and the receiving station 104 for the encoding, transmission, receipt, and decoding of an image. The network 106 can be, for example, the Internet. The network 106 can also be a local area network (LAN), a wide area network (WAN), a virtual private network (VPN), a cellular telephone network, or another means of transferring the image from the transmitting station 102 to the receiving station 104.

Implementations of the coding system 100 may differ from what is shown and described with respect to FIG. 1. In some implementations, the coding system 100 can omit the network 106. In some implementations, an image can be encoded and then stored for transmission at a later time to the receiving station 104 or another device having memory. In some implementations, the receiving station 104 can receive (e.g., via the network 106, a computer bus, and/or some communication pathway) the encoded image and store the encoded image for later decoding.

In some implementations, the functionality of the transmitting station 102 and of the receiving station 104 can change based on the particular operations performed. For example, during operations for encoding an image, the transmitting station 102 can be a computing device used to upload an image for encoding to a server, and the receiving station 104 can be the server that receives the image from the transmitting station 102 and encodes the image for later use (e.g., in rendering a webpage). In another example, during operations for decoding an encoded image, the transmitting station 102 can be a server that decodes the encoded image, and the receiving station 104 can be a computing device that receives the decoded image from the transmitting station 102 and renders the decoded image (e.g., as part of a webpage).

Figure 2:
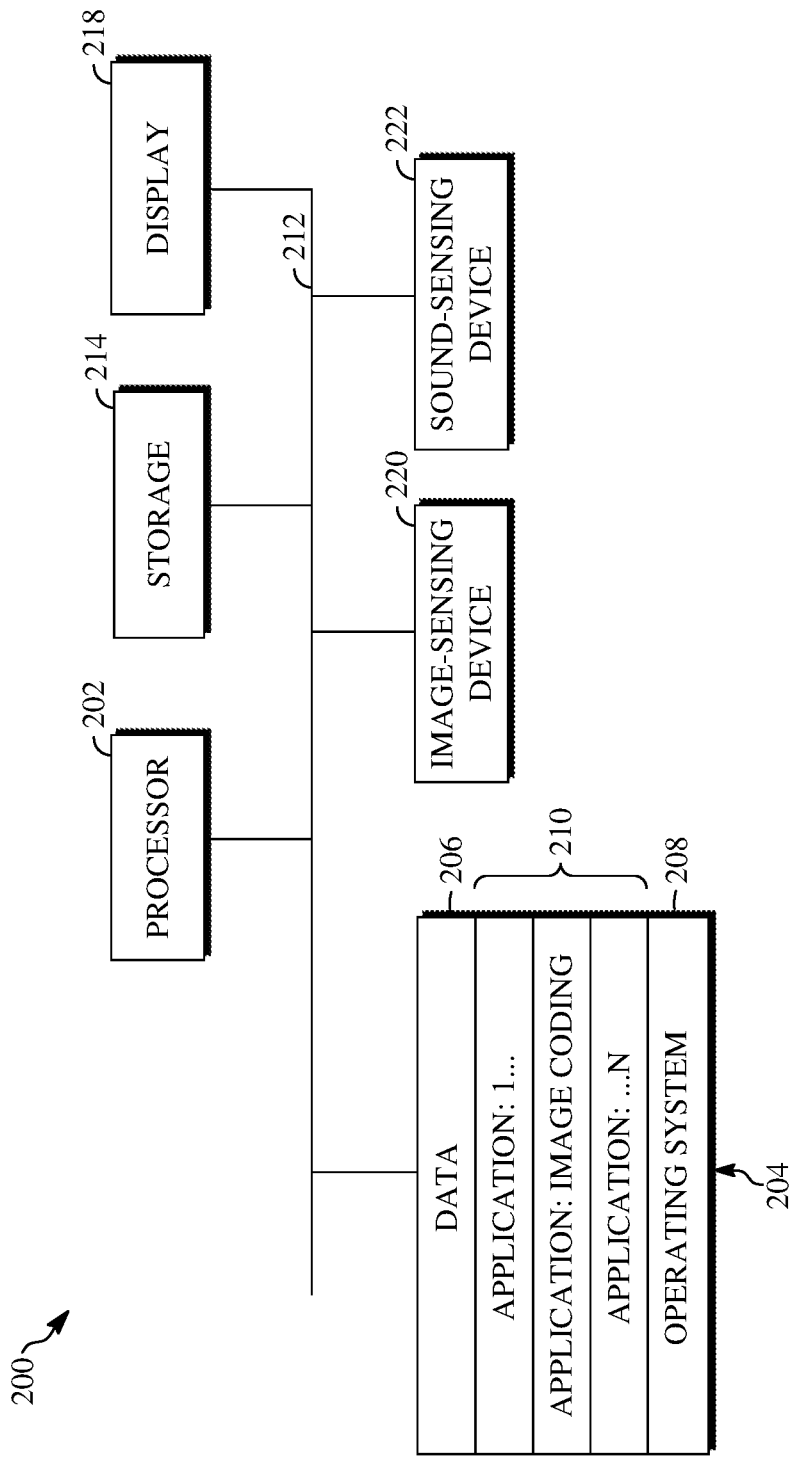
FIG. 2 is a block diagram of an example of an internal configuration of a computing device that can be used in an image coding system.

FIG. 2 is a block diagram of an example of an internal configuration of a computing device 200 that can be used in an image encoding and decoding system, for example, the image coding system 100 shown in FIG. 1. The computing device 200 may, for example, implement one or both of the transmitting station 102 or the receiving station 104. The computing device 200 can be in the form of a computing system including multiple computing devices, or in the form of one computing device, for example, a mobile phone, a tablet computer, a laptop computer, a notebook computer, a desktop computer, or the like.

A processor 202 in the computing device 200 can be a conventional central processing unit. Alternatively, the processor 202 can be another type of device, or multiple devices, now existing or hereafter developed, capable of manipulating or processing information. For example, although the disclosed implementations can be practiced with one processor as shown (e.g., the processor 202), advantages in speed and efficiency can be achieved by using more than one processor.

A memory 204 in the computing device 200 can be a read-only memory (ROM) device or a random-access memory (RAM) device in an implementation. However, other suitable types of storage devices can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the techniques described herein. For example, the application programs 210 can include applications 1 through N, which further include image encoding and/or decoding software that performs some or all of the techniques described herein. The computing device 200 can also include a secondary storage 214, which can, for example, be a memory card used with a mobile computing device. For example, an image can be stored in whole or in part in the secondary storage 214 and loaded into the memory 204 as needed for processing.

The computing device 200 can also include one or more output devices, such as a display 218. The display 218 may be, in one example, a touch-sensitive display that combines a display with a touch-sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including as a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or another image-sensing device, now existing or hereafter developed, which can sense an image such as the image of a user operating the computing device 200. The image-sensing device 220 can be positioned such that it is directed toward the user operating the computing device 200. For example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone or another sound-sensing device, now existing or hereafter developed, which can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Implementations of the computing device 200 may differ from what is shown and described with respect to FIG. 2. In some implementations, the operations of the processor 202 can be distributed across multiple machines (wherein individual machines can have one or more processors) that can be coupled directly or across a local area or other network. In some implementations, the memory 204 can be distributed across multiple machines, such as a network-based memory or memory in multiple machines performing the operations of the computing device 200. In some implementations, the bus 212 of the computing device 200 can be composed of multiple buses. In some implementations, the secondary storage 214 can be directly coupled to the other components of the computing device 200 or can be accessed via a network and can comprise an integrated unit, such as a memory card, or multiple units, such as multiple memory cards.

Figure 3:
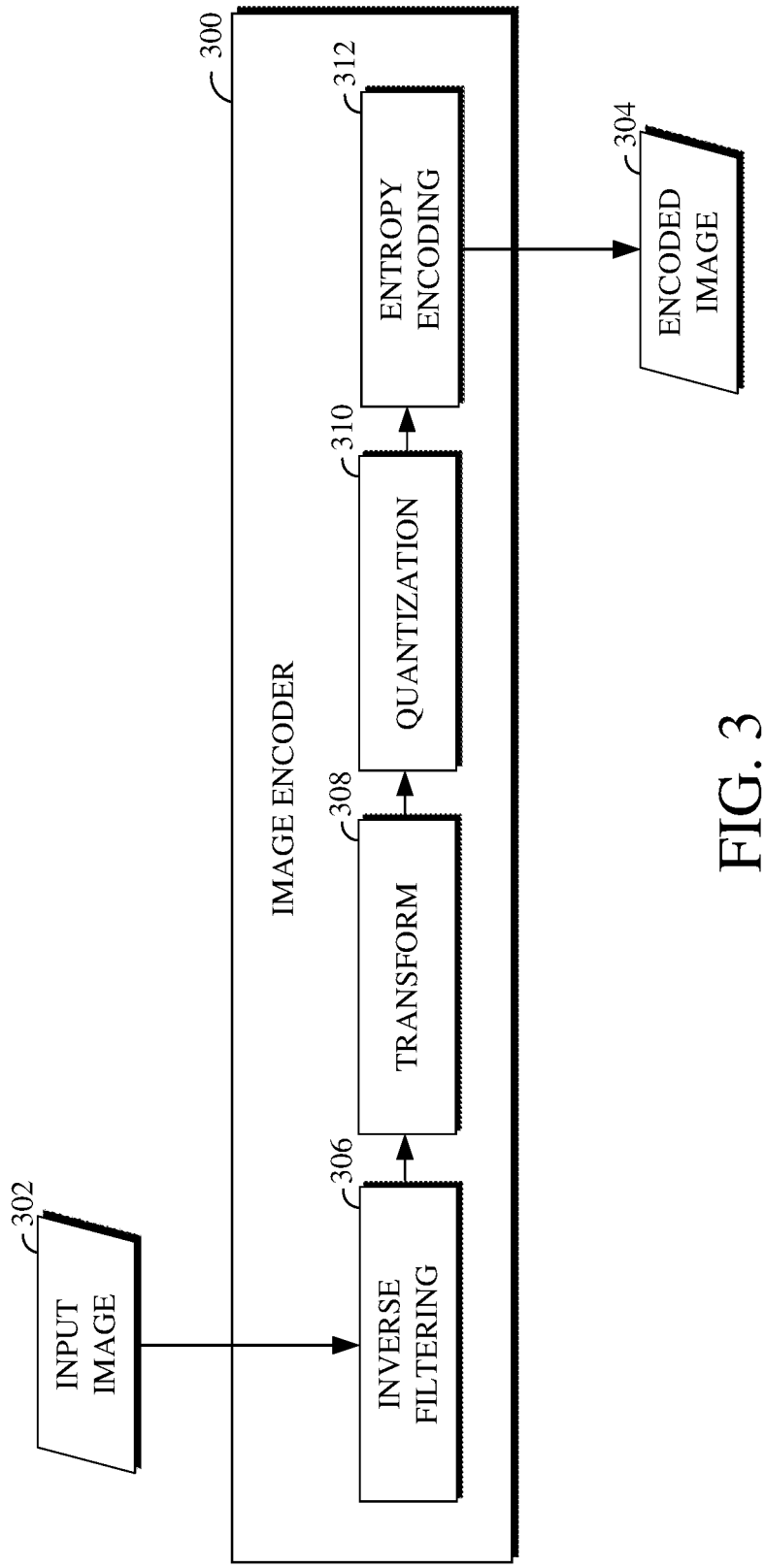
FIG. 3 is a block diagram of an example of an image encoder.

FIG. 3 is a block diagram of an example of an image encoder 300. FIG. 3 is a block diagram of an example of an image encoder 300. The image encoder 300 may, for example, be an image decoder implemented at a transmitting station of an image coding system, such as the transmitting station 102 of the image coding system 100 shown in FIG. 1. The image encoder 300 receives and encodes an input image 302 to produce an encoded image 304, which may be output to a decoder (e.g., implemented by a receiving station, such as the receiving station 104 shown in FIG. 1) or for storage.

The image encoder 300 includes an inverse filtering stage 306, a transform stage 308, a quantization stage 310, and an entropy encoding stage 312. The inverse filtering stage 306 performs filtering against the input image 302 to directly or indirectly reduce artifacts resulting from the transformation and/or quantization by the transform stage 308 and/or the quantization stage 310, respectively, such as by modifying pixel values of the input image 302 before the transformation and quantization thereof. In particular, the filtering stage 306 can perform filtering inverse to the filtering to later be performed at an image decoder (e.g., the image decoder 400 described below with respect to FIG. 4), such as to compensate for blurring resulting from the filtering by the image decoder. Implementations and examples for filtering a block of an image during encoding are described below with respect to FIG. 6.

The transform stage 308 transforms filtered blocks of the input image 302 into the frequency domain. For example, the transform stage 308 can use a discrete cosine transform (DCT) to transform the filtered blocks of the input image 302 from the spatial domain to the frequency domain. Alternatively, the transform stage 308 can use another Fourier-related transform or a discrete Fourier transform to transform the filtered blocks of the input image 302 from the spatial domain to the frequency domain. As a further alternative, the transform stage 308 can use another block-based transform to transform the filtered blocks of the input image 302 from the spatial domain to the frequency domain.

The quantization stage 310 quantizes transform coefficients produced as output by the transform stage 308. The quantization stage 310 converts the transform coefficients into discrete quantum values, which are referred to as quantized transform coefficients, using a quantization factor. For example, the transform coefficients may be divided by the quantization factor and truncated.

The entropy encoding stage 312 entropy encodes the quantized transform coefficients output from the quantization stage 310 using a lossless coding technique. For example, the lossless coding technique used by the entropy encoding stage 312 to entropy encode the quantized transform coefficients may be or include Huffman coding, arithmetic doing, variable length coding, or another coding technique. The encoded image 304 is produced based on the output of the entropy encoding stage 312. The encoded image 304 may be stored at a server (e.g., in a database or like data store) for later retrieval and decoding. For example, the encoded image 304 may be an image hosted on a website or an image provided for display on a webpage.

Implementations of the image encoder 300 may differ from what is shown and described with respect to FIG. 3. In some implementations, the image encoder 300 may be used to encode frames of a video sequence, such as by encoding an input video stream therefor to a bitstream. For example, the input image 302 may be an input frame to be encoded and the encoded image 304 may be an encoded frame, which may be encoded to a bitstream.

In such an implementation, the image encoder 300 may include a prediction stage for predicting motion within the frame. For example, the prediction stage may include functionality for using inter-prediction or intra-prediction to generate a prediction residual for a current block of the frame. In the case of intra-prediction, a prediction block may be formed from previously encoded and reconstructed samples in the frame itself. In the case of inter-prediction, a prediction block may be formed from samples in one or more previously constructed reference frames. The prediction block can be subtracted from the current block at the prediction stage to generate the prediction residual. The transform stage 306 may then receive and process the prediction residual, such as to produce transform coefficients for the current block.

In another example of the implementations in which the image encoder 300 may be used to encode frames of a video sequence, the image encoder 300 may include a reconstruction path to ensure that the image encoder 300 and a decoder (e.g., a decoder implemented at the a receiving station of an image coding system, such as the receiving station 104 of the image coding system 100) use the same reference frames to decode the bitstream produced by the image encoder 300 to represent the input video stream.

For example, the reconstruction path can perform functions that are similar to functions that take place during the decoding process (described below with respect to FIG. 4), including dequantizing the quantized transform coefficients at a dequantization stage and inverse transforming the dequantized transform coefficients at an inverse transform stage to produce a derivative residual. The prediction block that was predicted at the prediction stage can then be added to the derivative residual to create a reconstructed block.

In some implementations, the image encoder 300 can omit the filtering stage 306. For example, instead of performing filtering against the input image 302 or image data resulting from the processing thereof, the image encoder 300 can estimate angles to use for filtering pixels of blocks of the input image 302. The estimated angles can be recorded as an angular map for the input image 302. The angular map can be encoded to the encoded image 304, for example, to a header or other portion of the encoded image 304. Alternatively, the angular map can be encoded to a file separate from the encoded image 304, but which can be processed with the encoded image 304 during decoding, such as to decode the encoded image 304. In some implementations, an angular map as described above can be generated by the filtering stage 306 or using output of the filtering stage 306.

Figure 4:
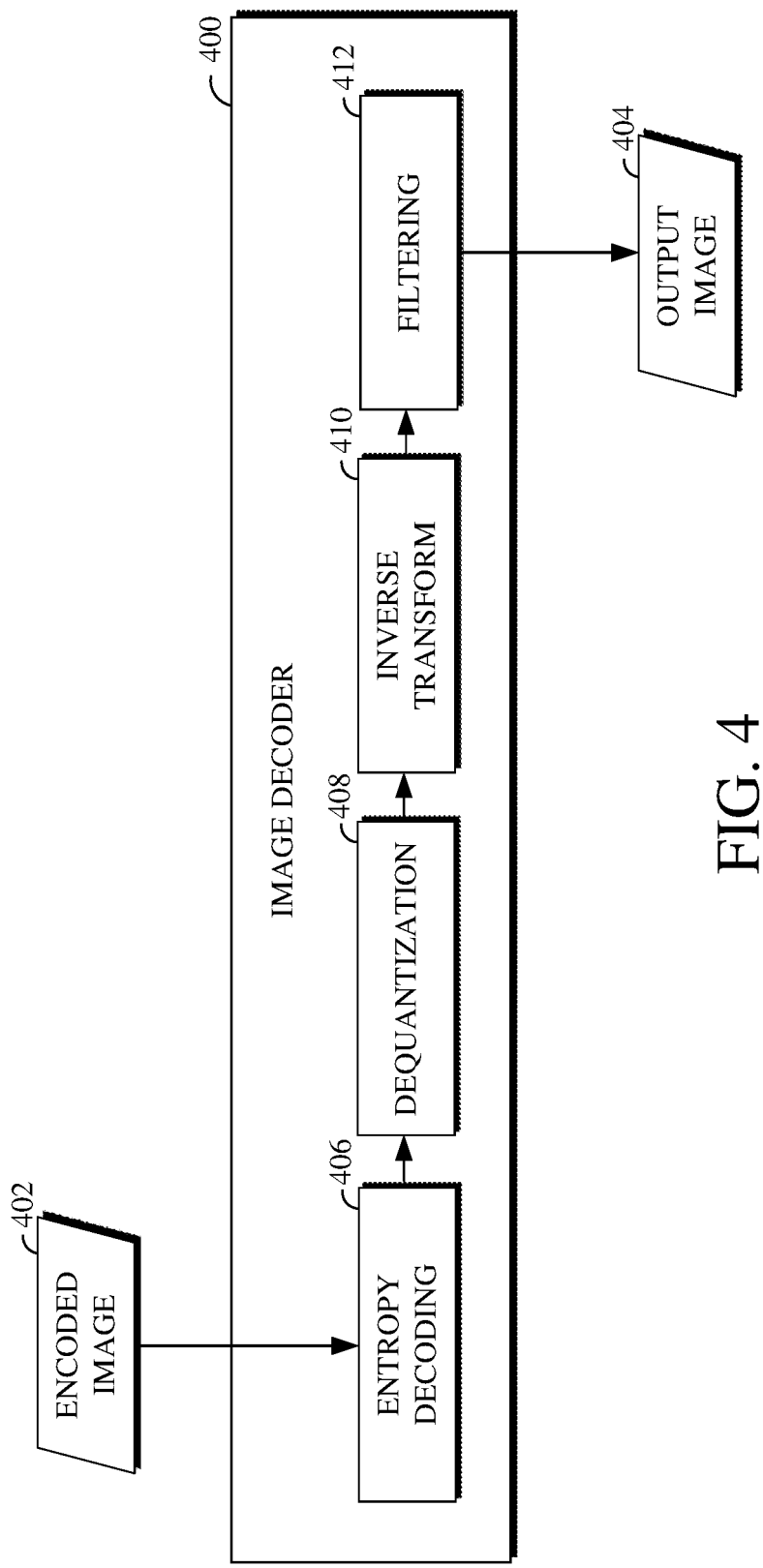
FIG. 4 is a block diagram of an example of an image decoder.

FIG. 4 is a block diagram of an example of an image decoder 400. The image decoder 400 may, for example, be an image decoder implemented at a receiving station of an image coding system, such as the receiving station 104 of the image coding system 100 shown in FIG. 1. The image decoder 400 receives and decodes an encoded image 402 (e.g., from storage or memory) to produce an output image 404, which may be output for display or storage. The output image 404 is perceptibly the same as or similar to an input image encoded using an encoder (e.g., the input image 302 and the image encoder 300 shown in FIG. 3). However, given that the encoding resulting in the encoded image 402 is lossy, the output image 404 may look substantially the same as, but not necessarily be identical to, the input image.

The image decoder 400 includes an entropy decoding stage 406, a dequantization stage 408, an inverse transform stage 410, and a filtering stage 412. The entropy decoding stage 406 entropy decodes encoded image data from the encoded image 402 using a lossless coding technique. For example, the lossless coding technique used by the entropy decoding stage 406 to entropy decode the encoded image data from the encoded image 402 may be or include Huffman coding, arithmetic doing, variable length coding, or another coding technique.

The entropy decoding stage 406 entropy decodes the encoded image data to produce quantized transform coefficients. The dequantization stage 408 dequantizes the quantized transform coefficients output from the entropy decoding stage 406, such as by multiplying the quantized transform coefficients by a quantization factor used to produce the encoded image 402. The inverse transform stage 410 inverse transforms the dequantized transform coefficients, such as by inverse transforming the dequantized transform coefficients from the frequency domain to the spatial domain.

The filtering stage 412 performs filtering to remove artifacts resulting from the encoding of the encoded image 402. For example, the filtering stage 412 can filter the coefficients output from the inverse transform stage 410 for a block of the encoded image 402 according to a main filtering direction of the block. Implementations and examples for filtering a block of an image during decoding are described below with respect to FIG. 7.

Implementations of the image decoder 400 may differ from what is shown and described with respect to FIG. 4. In some implementations, the image decoder 400 may be used to decode encoded frames of a video sequence, such as by decoding the encoded frames to an output video stream from a bitstream. For example, the encoded image 402 may be an encoded frame received from a bitstream and the output image 404 may be a decoded frame to be output for display or storage, such as within an output video stream.

In such an implementation, the image decoder 400 may include a prediction stage for predicting motion within the frame. For example, the prediction stage may include functionality for using inter-prediction or intra-prediction to generate a prediction residual for a current block of the frame based on the output of the inverse transform stage 410 and/or based on output of the entropy decoding stage. For example, using header information decoded from the bitstream and a prediction residual output from the inverse transformation, the prediction stage can create the same prediction block as was created at a prediction stage used for encoding the frame.

In the case of intra-prediction, a prediction block may be formed from previously decoded and reconstructed samples in the frame itself. In the case of inter-prediction, a prediction block may be formed from samples in one or more previously reconstructed reference frames. The prediction block and the prediction residual output from the inverse transform stage 410 can be used to reconstruct the block. The filtering stage 412 may then perform the filtering against the reconstructed block. Further, a reconstructed frame produced based on the reconstruction of the blocks thereof may be stored as a reference frame for use in reconstructing later frames to be decoded.

Figure 5:
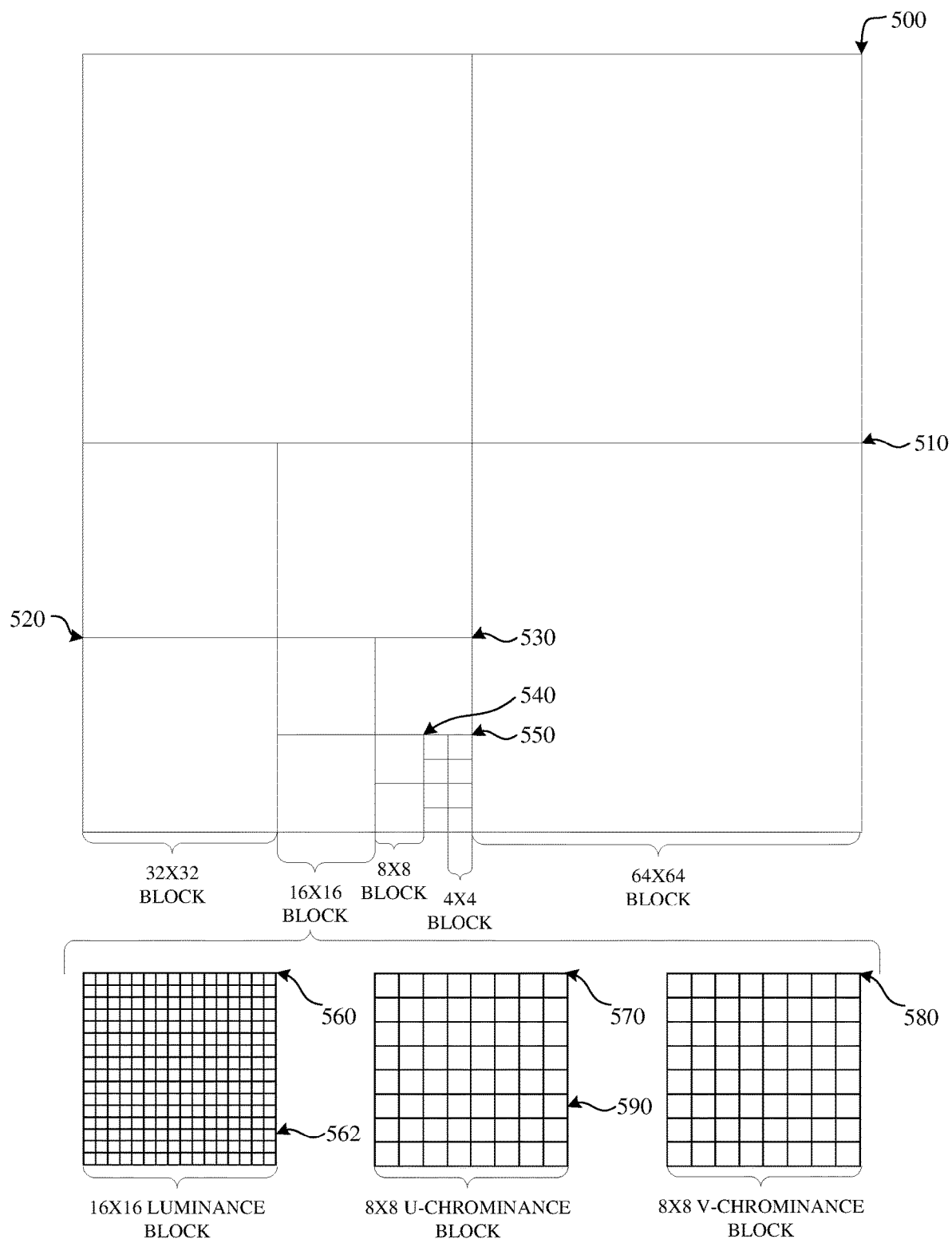
FIG. 5 is an illustration of examples of portions of an image.

FIG. 5 is an illustration of examples of portions of an image 500. As shown, the image 500 includes four 64×64 blocks 510, in two rows and two columns in a matrix or Cartesian plane. In some implementations, a 64×64 block may be a maximum coding unit, N=64. Each 64×64 block may include four 32×32 blocks 520. Each 32×32 block may include four 16×16 blocks 530. Each 16×16 block may include four 8×8 blocks 540. Each 8×8 block 540 may include four 4×4 blocks 550. Each 4×4 block 550 may include 16 pixels, which may be represented in four rows and four columns in each respective block in the Cartesian plane or matrix.

Figure 7:
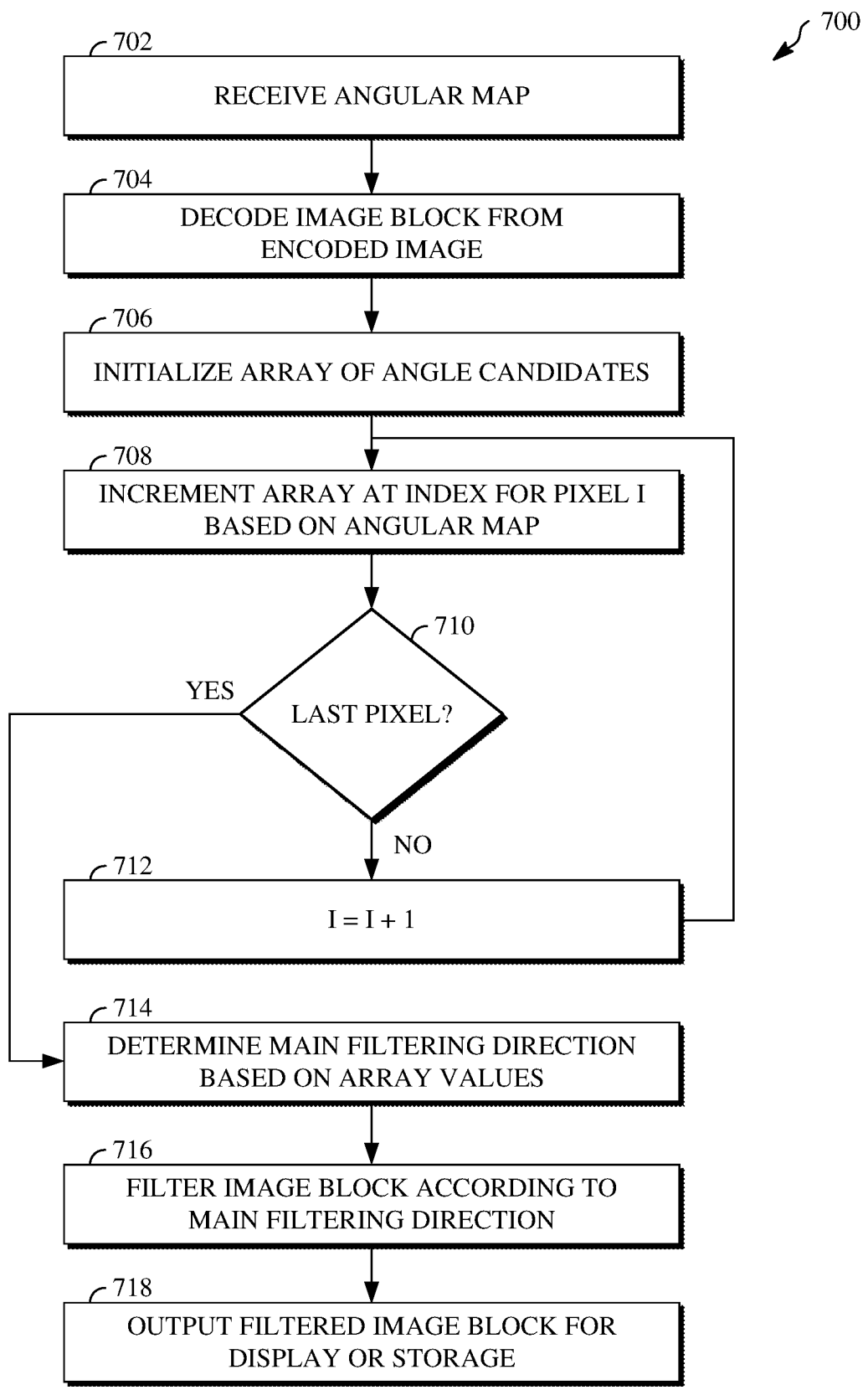
FIG. 7 is a flowchart diagram of an example of a technique for decoding an encoded image block using entropy-inspired directional filtering.

The pixels may include information representing an image captured in the image 500, such as luminance information, color information, and location information. In some implementations, a block, such as a 16×16 pixel block as shown, may include a luminance block 560, which may include luminance pixels 562; and two chrominance blocks 570, 580, such as a U or Cb chrominance block 570, and a V or Cr chrominance block 580. The chrominance blocks 570, 580 may include chrominance pixels 590. For example, the luminance block 560 may include 16×16 luminance pixels 562 and each chrominance block 570, 580 may include 8×8 chrominance pixels 590 as shown. Although one arrangement of blocks is shown, any arrangement may be used. Although FIG. 7 shows N×N blocks, in some implementations, N×M blocks may be used, wherein N and M are different numbers. For example, 32×64 blocks, 64×32 blocks, 16×32 blocks, 32×16 blocks, or any other size blocks may be used. In some implementations, N×2N blocks, 2N×N blocks, or a combination thereof, may be used.

In some implementations, coding the image 500 may include ordered block-level coding. Ordered block-level coding may include coding blocks of the image 500 in an order, such as raster-scan order, wherein blocks may be identified and processed starting with a block in the upper left corner of the image 500, or portion of the image 500, and proceeding along rows from left to right and from the top row to the bottom row, identifying each block in turn for processing. For example, the 64×64 block in the top row and left column of the image 500 may be the first block coded and the 64×64 block immediately to the right of the first block may be the second block coded. The second row from the top may be the second row coded, such that the 64×64 block in the left column of the second row may be coded after the 64×64 block in the rightmost column of the first row.

In some implementations, coding a block of the image 500 may include using quad-tree coding, which may include coding smaller block units within a block in raster-scan order. For example, the 64×64 block shown in the bottom left corner of the portion of the image 500 may be coded using quad-tree coding wherein the top left 32×32 block may be coded, then the top right 32×32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded.

Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, coding the image 500 may include encoding the information included in the original version of the image (e.g., an input image, such as the input image 302 shown in FIG. 3) by, for example, omitting some of the information from that original version of the image from a corresponding encoded image. For example, the coding may include reducing spectral redundancy, reducing spatial redundancy, or a combination thereof.

Reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of the image 500, and using a relatively small amount of information to represent each corresponding chrominance component for the portion of the image 500. For example, a portion of the image 500 may be represented by a high-resolution luminance component, which may include a 16×16 block of pixels, and by two lower resolution chrominance components, each of which represents the portion of the image as an 8×8 block of pixels. A pixel may indicate a value, for example, a value in the range from 0 to 255, and may be stored or transmitted using, for example, eight bits. Although this disclosure is described in reference to the YUV color model, another color model may be used.

Reducing spatial redundancy may include transforming a block into the frequency domain using, for example, a discrete cosine transform. For example, a unit of an encoder, such as the transform stage 306 shown in FIG. 3, may perform a discrete cosine transform using transform coefficient values based on spatial frequency.

Although described herein with reference to matrix or Cartesian representation of the image 500 for clarity, the image 500 may be stored, transmitted, processed, or any combination thereof, in any data structure such that pixel values may be efficiently represented for the image 500. For example, the image 500 may be stored, transmitted, processed, or any combination thereof, in a two-dimensional data structure such as a matrix as shown, or in a one-dimensional data structure, such as a vector array.

Furthermore, although described herein as showing a chrominance subsampled image where U and V have half the resolution of Y, the image 500 may have different configurations for the color channels thereof. For example, referring still to the YUV color space, full resolution may be used for all color channels of the image 500. In another example, a color space other than the YUV color space may be used to represent the resolution of color channels of the image 500. The implementations of this disclosure describe filtering which may be used on images of varying color channel resolutions and/or varying color spaces.

The blocks shown and described with respect to the image 500 are square or rectangular. However, the objects displayed within the image 500 may not be. For example, an object which is generally circular may be included within or otherwise intersect multiple blocks of the image 500. Furthermore, such a non-square or non-rectangular object would have oblique edges which to do not line up with the boundaries of the blocks of the image 500. The encoding of a block which includes an oblique edge may cause blocking artifacts to result along the oblique edge. A filtering tool which uses pixel information of the block to determine a main filtering direction for the block can be used to reduce artifacts along the oblique edge.

Figure 6:
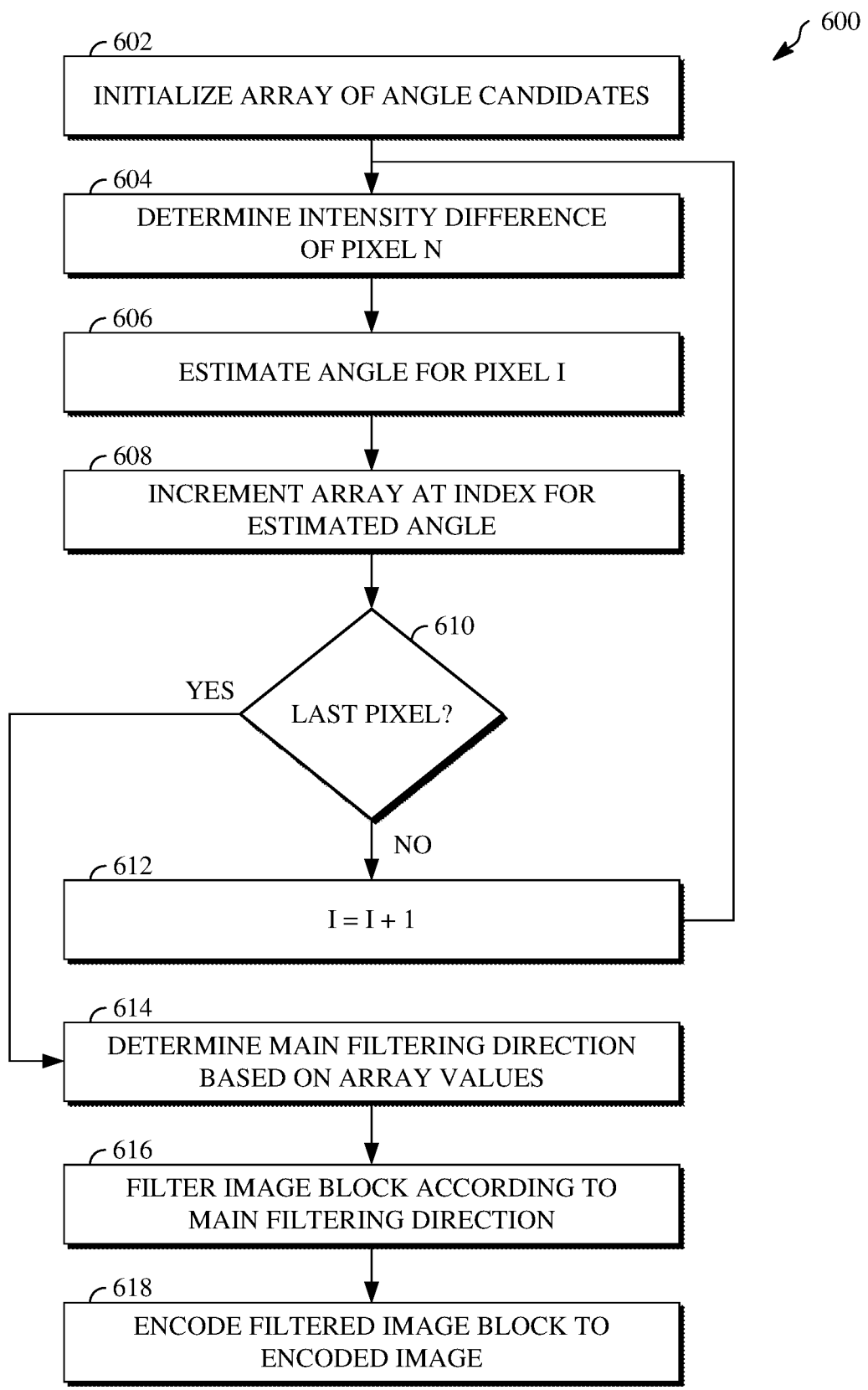
FIG. 6 is a flowchart diagram of an example of a technique for encoding an image block using entropy-inspired directional filtering.

Techniques for image coding using entropy-inspired directional filtering are now described with respect to FIGS. 6-7. FIG. 6 is a flowchart diagram of an example of a technique 600 for encoding an image block using entropy-inspired directional filtering. FIG. 7 is a flowchart diagram of an example of a technique 700 for decoding an encoded image block using entropy-inspired directional filtering.

One or more of the technique 600 or the technique 700 can be implemented, for example, as a software program that may be executed by computing devices such as the transmitting station 102 or the receiving station 104. For example, the software program can include machine-readable instructions that may be stored in a memory such as the memory 204 or the secondary storage 214, and that, when executed by a processor, such as the processor 202, may cause the computing device to perform one or more of the technique 600 or the technique 700. One or more of the technique 600 or the technique 700 can be implemented using specialized hardware or firmware. As explained above, some computing devices may have multiple memories or processors, and the operations described in one or more of the technique 600 or the technique 700 can be distributed using multiple processors, memories, or both.

For simplicity of explanation, the technique 600 and the technique 700 are each depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 6, a flowchart diagram of the example of the technique 600 for encoding an image block using entropy-inspired directional filtering is shown. The image block is a block of size M×N, where M and N may be the same number of different numbers. For example, the image block may be of a size between 2×2 and 32×32. At 602, an array of angle candidates is initialized. The array of angle candidates includes a number of indices equal to the number of angle candidates available for encoding the image block. The angle candidates represent edge angles of varying degrees. Each of the indices of the array of angle candidates corresponds to one of the angle candidates. For example, where 64 angle candidates are considered, the array includes 64 indices. Each of the 64 angle candidates would correspond to different edge angles which could conceivably be represented within the image block. The values at each index of the array are initially set to zero.

At 604, an intensity difference is determined for pixel I. Pixel I is a current pixel of the image block. Pixel I may be the first pixel of the image block or the last pixel of the image block, for example, according to a scan order or other processing order. The intensity difference is a difference between an intensity value of pixel I and an intensity value of one or more pixels selected from a group of pixels located in the image block and excluding pixel I. For example, the intensity difference for pixel I can be determined based on a difference in intensity values of neighboring pixels of pixel I. For example, a first delta value can be determined as representing a difference in intensity values between a left neighboring pixel of pixel I and a right neighboring pixel of pixel I. A second delta value can be determined as representing a difference in intensity values between an above neighboring pixel of pixel I and a below neighboring pixel of pixel I. The first delta value represents the change in pixel intensity along the X-axis for pixel I. The second delta value represents the change in pixel intensity along the Y-axis for pixel I.

The intensity difference for pixel I can be determined based on the first delta value, the second delta value, or both. For example, when the intensity difference for pixel I is determined based on the first delta value, the intensity difference for pixel I can be equal to the difference in intensity values between the left and right neighboring pixels of pixel I. In another example, when the intensity difference for pixel I is determined based on the second delta value, the intensity difference for pixel I can be equal to the difference in intensity values between the above and below neighboring pixels of pixel I. In yet another example, where both of the first delta value and the second delta value are used to determine the intensity difference for pixel I, the first delta value and the second delta value can be combined. For example, the intensity value for pixel I can be determined as the average of the first delta value and the second delta value. The average may be weighted or unweighted.

At 606, an angle is estimated for pixel I. The angle represents the angle of an object edge on which pixel I is located. The angle is estimated by calculating a function of the intensity difference for pixel I. The function calculated may be an arctan^2 function or another suitable function. The estimated angle may correspond to an angle candidate of the array of angle candidates.

At 608, a value at an index within the array of an angle candidate which corresponds to the estimated angle is increased. Where the estimated angle corresponds to an angle candidate of the array of angle candidates, the index associated with that angle candidate in the array is identified. The value at that index is then increased. The value at the index may be increased by a floating point value calculated as the output of a function applied to the edge strength for pixel I along the estimated angle. The function may be a logarithmic function. For example, the logarithmic function may be expressed as $\log(x+1)$, where x represents the angle estimated for pixel I and f represents a floating point value. Alternatively, the function may be an exponential function. For example, the exponential function may be expressed as $f=1-\exp(-x)$, where x represents the angle estimated for pixel I and f represents a floating point value. In some implementations, the value of the index can be increased by one or otherwise incremented according to a fixed scale.

At 610, a determination is made as to whether pixel I is the last pixel in the image block. For example, a scan order or other processing tool can be used to check whether another pixel of the image block remains to be processed. At 612, responsive to a determination that pixel I is not the last pixel in the image block, the value of I is increased by 1. The technique 600 then returns to 604 to repeat the operations at 604, 606, and 608 for the new pixel I.

At 614, responsive to a determination that pixel I is not the last pixel in the image block, a main filtering direction of the image block is determined based on the values of the array. The main filtering direction is determined based on the angle candidate having the largest value in the array. Determining the main filtering direction thus includes identifying the index of the array having the largest value after the increasing is completed for the pixels of the image block and selecting the angle candidate associated with that identified index as the main filtering direction.

At 616, the image block is filtered according to the main filtering direction. Filtering the image block according the main filtering direction includes using a filter of a filter type to change at least one of the pixel values along the main filtering direction within the image block. The filter type is one of a directional filter, a semi-directional filter, or a circular filter. The filter type may be selected depending on a ratio of the main filtering direction to an average filtering direction of the image block. For example, an average of the values at one or more of the indices of the array can be determined. A filter type to use for filtering along the main filtering direction can then be selected based on a ratio of the largest value to the average. The average filtering direction represents an angle which corresponds to an angle candidate having a value equal to the average of the values. Where no angle candidate has a value equal to the average of the values, the average filtering direction represents an angle which corresponds to an angle candidate having a value closest to the average of the values.

The selection of the filter type is based on a measure of confidence in the main filtering direction determined for the image block. That is, the closer the main filtering direction and the average filtering direction are, the more likely it is that the image block includes edges at a number of different angles, and thus the lower the confidence in the main filtering direction. However, the farther apart the main filtering direction and the average filtering direction are, the more likely it is that the main filtering direction represents the angle of the main (or, in some cases, only) edge of the image block, and thus the higher the confidence in the main filtering direction. Threshold values and/or threshold ranges may be established for indicating which filter type to use based on the relationship between the main filtering direction and the average filtering direction. For example, a first filter type can be used when the relationship between the main filtering direction and the average filtering direction indicates high confidence, a second filter type can be used when the relationship between the main filtering direction and the average filtering direction indicates medium confidence, and a third filter type can be used when the relationship between the main filtering direction and the average filtering direction indicates low confidence. Filtering the image block can thus include using a filter of the selected filter type. At 618, the filtered image block is encoded to an encoded image.

In some implementations, the value at more than one index of the array of angle candidates can be increased for each pixel I. For example, a Gaussian distribution for the angle candidates can be determined based on the estimated angle of pixel I. The index of the array which is associated with an angle candidate corresponding to the estimated angle of pixel I can be increased by a first increase value (e.g., 50). Each neighboring index of the index incremented by the first increase value can be increased by a second increase value which is less than the first increase value (e.g., 25). In some such implementations, further neighboring indices, such as each neighboring index of the indices increased by the second increase value, can be increased by increasingly smaller increase values according to the Gaussian distribution.

In some implementations, the technique 600 includes generating an angular map. For example, the angular map may be an array, matrix, table, or other variable or object with positions corresponding to the pixels of the image block. The estimated angles for each of the pixels of the image block can be recorded at respective positions of the angular map. The angular map can be encoded to the encoded image, for example, to a header or other portion of the encoded image. Alternatively, the angular map can be encoded to a file separate from the encoded image, but which can be processed with the encoded image during decoding, such as to decode the encoded image.

In some implementations, the array of angle candidates may not be used. For example, a different structure which may be updated based on angles estimated for individual pixels or sets of pixels of the image block may be used. For example, the different structure may be a matrix, a table, or another variable or object. In another example, a data structure may not be used to monitor estimated angles. For example, a heuristic for orientation calculation not inspired by entropy of the image block may consider various directionalities of the image block.

In some implementations, the array of angle candidates can be reset after the encoding of the image block to the encoded image. For example, the values at the indices of the array of angle candidates can be reset to zero after encoding the image block.

Referring next to FIG. 7, a flowchart diagram of the example of the technique 700 for decoding an encoded image block using entropy-inspired directional filtering is shown. At 702, an angular map is received. The angular map may be an array, matrix, table, or other variable or object with positions corresponding to the pixels of the image block. The estimated angles for each of the pixels of the image block can be recorded at respective positions of the angular map. The angular map can be encoded to the encoded image, for example, to a header or other portion of the encoded image. Alternatively, the angular map can be encoded to a file separate from the encoded image. The angular map indicates the angles which were estimated for the pixels of the encoded image.

At 704, the image block is decoded from an encoded image. Decoding the image block from the encoded image may include entropy decoding syntax elements from the encoded image to produce quantized transform coefficients, dequantizing the quantized transform coefficients to produce transform coefficients, and inverse transforming the transform coefficients to produce pixel values for the image block.

At 706, an array of angle candidates is initialized. The array of angle candidates includes a number of indices equal to the number of angle candidates available for encoding the image block. The angle candidates represent edge angles of varying degrees. Each of the indices of the array of angle candidates corresponds to one of the angle candidates. For example, where 64 angle candidates are considered, the array includes 64 indices. Each of the 64 angle candidates would correspond to different edge angles which could conceivably be represented within the image block. The values at each index of the array are initially set to zero.

At 708, an index of the array which corresponds to the estimated angle for pixel I of the image block is increased. Increasing the index of the array includes determining the estimated angle for pixel I based on the angular map. For example, a position which corresponds to pixel I within the angular map can be identified. The angle indicated at that position can be identified as the estimated angle for pixel I. The value at the index corresponding to the angle candidate associated with the estimated angle can then be increased.

At 710, a determination is made as to whether pixel I is the last pixel in the image block. For example, a scan order or other processing tool can be used to check whether another pixel of the image block remains to be processed. At 712, responsive to a determination that pixel I is not the last pixel in the image block, the value of I is increased by 1. The technique 700 then returns to 708 to repeat the operations at 708 for the new pixel I.

At 714, responsive to a determination that pixel I is not the last pixel in the image block, a main filtering direction of the image block is determined based on the values of the array. The main filtering direction is determined based on the angle candidate having the largest value in the array. Determining the main filtering direction thus includes identifying the index of the array having the largest value after the increasing is completed for the pixels of the image block and selecting the angle candidate associated with that identified index as the main filtering direction.

At 716, the image block is filtered according to the main filtering direction. Filtering the image block according to the main filtering direction includes using a filter of a filter type to change at least one of the pixel values along the main filtering direction within the image block. The filter type is one of a directional filter, a semi-directional filter, or a circular filter. The filter type may be selected depending on a ratio of the main filtering direction to an average filtering direction of the image block. For example, an average of the values at one or more of the indices of the array can be determined. A filter type to use for filtering along the main filtering direction can then be selected based on a ratio of the largest value to the average. Filtering the image block can thus include using a filter of the selected filter type. At 718, the filtered image block is output for display or storage.

In some implementations, the value at more than one index of the array of angle candidates can be increased for each pixel I. For example, a Gaussian distribution for the angle candidates can be determined based on the estimated angle of pixel I. The index of the array which is associated with an angle candidate corresponding to the estimated angle of pixel I can be increased by a first increase value (e.g., 50). Each neighboring index of the index increased by the first increase value can be increased by a second increase value which is less than the first increase value (e.g., 25). In some such implementations, further neighboring indices, such as each neighboring index of the indices increased by the second increase value, can be increased by increasingly smaller increase values according to the Gaussian distribution.

In some implementations, the array of angle candidates may not be used. For example, a different structure which may be updated based on angles estimated for individual pixels or sets of pixels of the image block may be used. For example, the different structure may be a matrix, a table, or another variable or object. In another example, a data structure may not be used to monitor estimated angles. For example, a heuristic for orientation calculation not inspired by entropy of the image block may consider various directionalities of the image block. In yet another example, the array of angle candidates may simply be omitted. For example, the angular map may be used to identify the main filtering direction of the image block without processing or other verification using an array or other structure.

In some implementations, the array of angle candidates can be reset after the encoding of the image block to the encoded image. For example, the values at the indices of the array of angle candidates can be reset to zero after encoding the image block.

The aspects of encoding and decoding described above illustrate some examples of encoding and decoding techniques and hardware components configured to perform all or a portion of those examples of encoding and/or decoding techniques. However, it is to be understood that encoding and decoding, as those terms are used in the claims, could mean encoding, decoding, transforming, or another processing or changing of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to require the same implementation unless described as such.

All or a portion of the implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations, examples, and aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for encoding an image block, the method comprising:

initializing values at indices of an array of angle candidates to zero, wherein a number of the indices of the array is equal to a number of angle candidates available for encoding the image block, wherein each of the indices corresponds to one of the angle candidates;

for each current pixel of a plurality of pixels of the image block:
  determining an intensity difference based on a difference in intensity values of neighboring pixels of the current pixel;
  estimating an angle for the current pixel by calculating a function of the intensity difference of the current pixel; and
  increasing a value at an index within the array of the angle candidate that corresponds to the estimated angle;

determining a main filtering direction of the image block based on the angle candidate having the largest value in the array;

filtering the image block according to the main filtering direction to remove one or more artifacts along an oblique edge associated with the image block; and encoding the filtered image block to an encoded image.

2. The method of claim 1, wherein determining an intensity difference based on a difference in intensity values of neighboring pixels of the current pixel comprises:
  determining a first delta value representing a difference in intensity values between a left neighboring pixel of the current pixel and a right neighboring pixel of the current pixel;
  determining a second delta value representing a difference in intensity values between an above neighboring pixel of the current pixel and a below neighboring pixel of the current pixel; and
  determining the intensity difference for the current pixel based on the first delta value and the second delta value.

3. The method of claim 2, wherein increasing the value at the index within the array of the angle candidate that corresponds to the estimated angle comprises:
  calculating a function of an edge strength of the current pixel along the estimated angle to determine a floating point value for the current pixel; and
  increasing the value at the index of the angle candidate based on the floating point value.

4. The method of claim 3, wherein the function calculated for the edge strength of the current pixel is one of a logarithmic function or an exponential function.

5. The method of claim 1, wherein increasing a value at an index of the angle candidate within the array for a current pixel comprises:
  increasing the value at the index of the angle candidate in the array by a first increase value; and
  increasing values at neighboring indices of the index of the angle candidate in the array by a second increase value which is less than the first increase value.

6. The method of claim 1, wherein filtering the image block according to the main filtering direction to remove the one or more oblique edges associated with the image block comprises:
  determining an average of the values at one or more of the indices of the array; and
  selecting a filter type based on a ratio of the largest value to the average,
  wherein the image block is filtered using a filter of the selected filter type.

7. The method of claim 1, further comprising:
  generating an angular map used to indicate the main filtering direction of the image block to a decoder for decoding the encoded image.

8. An apparatus for encoding an image block, the apparatus comprising:
  a memory storing instructions and an array of angle candidates having a number of indices based on a number of angle candidates available for encoding the image block; and
  a processor configured to execute the instructions to:
    initialize values at the indices of the array of angle candidates to zero;
    for each current pixel of a plurality of pixels of the image block:
      determine an intensity difference based on a difference in intensity values of neighboring pixels of the current pixel;
      estimate an angle for the current pixel by calculating a function of the intensity difference of the current pixel; and
      increase a value at an index within the array of the angle candidate that corresponds to the estimated angle;
    determine a main filtering direction of the image block based on the angle candidate having the largest value in the array;
    filter the image block according to the main filtering direction to remove one or more artifacts along an oblique edge associated with the image block; and
    encode the filtered image block to an encoded image.

9. The apparatus of claim 8, wherein the instructions to determine the intensity difference based on the difference in intensity values of the neighboring pixels of the current pixel include instructions to:
  determine a first delta value representing a difference in intensity values between a left neighboring pixel of the current pixel and a right neighboring pixel of the current pixel;
  determine a second delta value representing a difference in intensity values between an above neighboring pixel of the current pixel and a below neighboring pixel of the current pixel; and
  determine the intensity difference for the current pixel based on the first delta value and the second delta value.

10. The apparatus of claim 9, wherein the instructions to increase the value at the index within the array of the angle candidate that corresponds to the estimated angle instructions to:
  calculate a function of an edge strength of the current pixel along the estimated angle to determine a floating point value for the current pixel; and
  increase the value at the index of the angle candidate based on the floating point value.

11. The apparatus of claim 10, wherein the function calculated for the edge strength of the current pixel is one of a logarithmic function or an exponential function.

12. The apparatus of claim 8, wherein the instructions to increase a value at an index of the angle candidate within the array for a current pixel include instructions to:
  increase the value at the index of the angle candidate in the array by a first increase value; and
  increase values at neighboring indices of the index of the angle candidate in the array by a second increase value which is less than the first increase value.

13. The apparatus of claim 8, wherein the instructions to filter the image block according to the main filtering direction to remove the one or more oblique edges associated with the image block include instructions to:
- determine an average of the values at one or more of the indices of the array; and
- select a filter type based on a ratio of the largest value to the average,
- wherein the image block is filtered using a filter of the selected filter type.

14. The apparatus of claim 8, wherein the instructions include instructions to:
- generate an angular map used to indicate the main filtering direction of the image block to a decoder for decoding the encoded image.

15. A method for encoding an image block, the method comprising:
- determining respective intensity differences for at least some pixels of the image block based on neighboring pixels of respective ones of the at least some pixels;
- estimating respective angles for each of the at least some pixels based on the respective intensity differences;
- determining a main filtering direction of the image block based on the estimated angles;
- filtering the image block according to the main filtering direction to remove one or more artifacts along an oblique edge associated with the image block; and
- encoding the filtered image block to an encoded image.

16. The method of claim 15, wherein determining an intensity difference for a current pixel of the at least some pixels based on neighboring pixels of the current pixel comprises:
- determining a first delta value representing a difference in intensities between a left neighboring pixel of the current pixel and a right neighboring pixel of the current pixel;
- determining a second delta value representing a difference in intensities between an above neighboring pixel of the current pixel and a below neighboring pixel of the current pixel; and
- determining the intensity difference for the current pixel based on the first delta value and the second delta value.

17. The method of claim 15, wherein an array of angle candidates used for encoding the image block has a number of indices based on a number of angle candidates available for encoding the image block, wherein each of the indices corresponds to one of the angle candidates, wherein the method further comprises:
- for a current estimated angle of the estimated angles:
  - determining a current angle candidate of the number of angle candidates which corresponds to the current estimated angle; and
  - increasing a value at an index of the current angle candidate within the array.

18. The method of claim 17, wherein determining a main filtering direction of the image block based on the estimated angles comprises:
- selecting, as the main filtering direction, an angle candidate of number of angle candidates corresponding to an index of the array having a largest value.

19. The method of claim 17, further comprising:
- initializing values at the indices of the array of angle candidates to zero before encoding the image block; and
- resetting the values at the indices of the array of angle candidates to zero after encoding the image block.

20. The method of claim 17, wherein filtering the image block according to the main filtering direction to remove the one or more oblique edges associated with the image block comprises:
- determining an average of values at one or more of the indices of the array of angle candidates; and
- selecting a filter type based on a ratio of the largest value to the average,
- wherein the image block is filtered using a filter of the selected filter type.

* * * * *